United States Patent [19]
Fioriti et al.

[11] Patent Number: 5,562,940
[45] Date of Patent: Oct. 8, 1996

[54] COATING MIX FOR SIMULATING CHICKEN SKIN AND METHOD OF USE

[75] Inventors: Frank R. Fioriti, Hopewell Junction; Karl R. Ackermann, Croton-on-Hudson, both of N.Y.

[73] Assignee: Kraft Foods, Inc., Northfield, Ill.

[21] Appl. No.: 397,513

[22] Filed: Mar. 1, 1995

[51] Int. Cl.⁶ ............... A23L 1/00; A23L 1/09; A23L 1/053; A23L 1/0522

[52] U.S. Cl. ............ 426/289; 426/658; 426/578; 426/661; 426/573

[58] Field of Search ................ 426/289, 658, 426/578, 661, 573

[56] References Cited

U.S. PATENT DOCUMENTS

| | | | |
|---|---|---|---|
| 4,068,009 | 1/1978 | Rispoli et al. | 426/291 |
| 4,208,442 | 6/1980 | Evans et al. | 426/296 |
| 4,218,485 | 8/1980 | Lee et al. | 426/296 |
| 4,367,242 | 1/1983 | Jarvis et al. | 426/293 |
| 4,496,601 | 1/1985 | Rispoli et al. | 426/554 |
| 4,504,509 | 3/1985 | Bell et al. | 426/549 |
| 4,640,837 | 2/1987 | Coleman et al. | 426/94 |
| 5,057,329 | 10/1991 | Stypula et al. | 426/92 |

OTHER PUBLICATIONS

Technical Services Bulletin; "Crisp Film®", National Starch and Chemical Company, 1992.

*Primary Examiner*—Esther M. Kepplinger
*Assistant Examiner*—Choon P. Koh
*Attorney, Agent, or Firm*—Thomas R. Savoie; Thomas A. Marcoux

[57] ABSTRACT

A coating mix for application to skinless chicken pieces prior to baking. After baking, the coating simulates the appearance and texture of real chicken skin. The mix preferably contains on a weight basis from 25–50 parts maltodextrin, from 6–20 parts high-amylose starch, from 0.5–4 parts CMC, and from 5–15 parts powdered fat and from 6–20 parts pregelatinized starch.

14 Claims, No Drawings

COATING MIX FOR SIMULATING CHICKEN SKIN AND METHOD OF USE

BACKGROUND OF THE INVENTION

This present invention relates generally to an edible food mix and, more particularly, is directed to a coating mix which is to be applied to pieces of skinless chicken prior to baking and to a method of using this coating.

Chicken is a relatively inexpensive and low-fat source of animal protein. Many prior art patents have disclosed coating mixes for use with pieces of chicken with skin and designed to impart the appearance and texture of fried chicken to these coated chicken pieces upon oven cooking. In this manner frying, along with its attendant oil uptake, is avoided and the cooked chicken has a lower calorie and fat content as compared to fried chicken. These coating mixes typically contains farinaceous components as the major ingredients, with bread crumbs and flour constituting the bulk of the farinaceous ingredients. Examples of such mixes are disclosed in U.S. Pat. Nos. 4,640,837 to Coleman et al.; 4,496,901 to Rispoli et al.; 4,218,485 to Lee et al.; 4,208,442 to Evans et al., and 4,068,009 to Rispoli et al.

U.S. Pat. No. 4,367,242 to Jarvis et al. describes a coating mix which contains a high level of gelatin and does not contain, in one form, any granular farinaceous ingredients. This mix is designed for application to chicken with skin and, as a result of its high gelatin content, produces a cooked coating which has a chewy, leathery texture.

Due to the fact that most of the fat contained in chicken is present in the skin, it has become increasingly popular among consumers to either remove the skin from chicken prior to cooking or to purchase skinless chicken pieces. It would be customary to then either pan fry, saute or grill these pieces of skinless chicken. These skinless chicken preparations are generally not regarded as highly by consumers as chicken with skin preparations.

It would be desirable if skinless chicken could be prepared in a manner that presents to the consumer the appearance and texture of real chicken skin after oven preparation. This option has not previously been available.

SUMMARY OF THE INVENTION

This invention is directed to a dry coating mix for application to pieces of skinless chicken prior to baking. Upon baking, the coating develops into a simulated chicken skin which resembles the appearance and texture of real chicken skin, such as is present after chicken with skin is baked in a conventional oven.

The coating mix of this invention is essentially free of farinaceous components such as bread crumbs, cereal fines and flour. The dry coating mix of this invention is comprised of, and in unflavored form preferably consists essentially of, maltodextrin, high-amylose starch, pregelatinized starch, carboxymethylcellulose gum and powdered fat. In the absence of flavors, spices and seasoning, the coating mix will contain, on a weight basis, from 40–70% maltodextrin, 10–25% high-amylose starch, from 1–5% of carboxymethylcellulose and from 6–20% of powdered fat. Preferably the coating mix will also contain from 10–25% of a pregelatinized starch.

DESCRIPTION OF PREFERRED EMBODIMENTS

The coating mixes formulated in accordance with this invention are applied to pieces of skinless chicken. Upon baking, the coating produces a simulated skin which is surprisingly similar in texture, appearance and functionality to real chicken skin. To achieve the desired effect, the coating mix contains critical amounts of specific ingredients which, in combination, function to produce a simulated chicken skin.

The coating mix of this invention will contain various flavor agents including salt, sugar, natural flavors, seasonings, such as pepper, onion powder, garlic powder and the like, spices, such as paprika, and the like, and herbs, such as rosemary, parsley, sage, thyme, basil and the like, as well as various color agents such as caramel color and tumeric. Collectively, these flavor agents ingredients will constitute a significant portion, typically 25–45% by weight of the coating mix. As the use level of these ingredients may vary widely depending on the particular flavor desired for the coating mix, the percentage and ratios for the critical functional ingredients employed in the coating mix will be expressed in terms of a "base" mix which is intended to mean in the absence of flavor agents, and color agents.

The dry coating mix of this invention will contain maltodextrin as the major ingredient. The maltodextrin will have a DE (dextrose equivalent) of from 5–20, preferably 8–15, and be present in the base mix at a level of from 40–70%, preferably 50–65%. The maltodextrin will function as a film former and also to promote adherence of the flavor, spice and seasoning ingredients. At levels below about 40%, the amount of coating picked up on the surface of the skinless chicken will be too low to produce the desired skin formation. A low coating pickup will also result in low flavor impact. At levels above about 70%, the baked coating will have an undesirable sticky texture and mouthfeel.

A second critical ingredient contained in the coating base mix of this invention is an ungelatinized, preferably high-amylose, starch, most preferably a modified high-amylose corn starch, such as that marketed under the trademark CRISP FILM® by National Starch and Chemical Company, Bridgewater, N.J. 08807. High-amylose starch, according to this invention, shall mean a total amylose content of the debranched starch of at least 40% by weight. The amylose content of CRISP FILM is around 55%. The ungelatinized starch will function to help the coating adhere to the skinless chicken and to aid in skin formation. The ungelatinized starch level in the base mix will be 10–25%. This level will be 15–25% when the ungelatinized, high-amylose starch is the only starch component present in the coating base mix. At levels above 25%, the coating will be heavy with a tacky or leathery texture and the flavor may be considered as too starchy. For use in this invention, the starch should have a particle size wherein at least 80% by weight of the starch passes thru an 80 mesh U.S. Standard Sieve (openings of 177 microns) and preferably wherein at least 90% by weight passes thru a 100 mesh U.S. Standard Sieve (openings of 149 microns).

A portion of the ungelatinized, high-amylose starch may be replaced with a pregelatinized starch such as a pregelatinized waxy maize starch. Instant Clear Gel ®, a modified and stabilized waxy maize starch which is marketed by National Starch and Chemical Company, Bridgewater, N.J. 08807 is a suitable pregelatinized starch for use in this invention. A preferred level for the pregelatinized starch in the base mix is from 10–25%, preferably from 15–22%, by weight. At these elevated levels of pregelatinized starch, the amount of high-amylose starch will typically be 10–18%, preferably 12–16%, by weight. The total level for all starch components contained in the base mix will preferably be from 20–35% by weight. The substitution pregelatinized starch for a portion of the ungelatinized starch has been found to remove any gummy mouthfeel or starch flavor from the cooked coating.

A third critical ingredient contained in the coating base mix of this invention is a water-soluble, sodium carboxymethylcellulose gum (CMC); preferably of the high viscosity type, such as that marketed under the designation 9H4XF by Aqualon, Wilmington, Delaware 19899. High viscosity means that a 1% solution of the CMC gum at 25° C. has a viscosity in excess of 1,000 cps, preferably in excess of 3,000 cps. Preferably the degree of substitution of hydroxyl groups per anhyroglucose unit is at least 0.7, most preferably at least 0.8. The CMC gum will also function to adhere the coating mix to the skinless chicken and to aid in forming a desirable coating texture. The gum level in the base mix will be 1–5%, preferably 1.5–4%. At levels below about 1%, there will be low coating pickup and poor skin formation; at levels above about 5%, the coating will have an undesirable gelatinous, sticky and grainy texture and mouthfeel. Alternative gums, such as xanthan, guar, locust bean, propylene glycol alginate and calcium carrageenan were evaluated for use in the coating mix formulation of this invention; however, use of these gums was rejected as a less desirable baked film was produced as compared to CMC. For use in this invention, the CMC should preferably have a fine particle size such that at least 50% by weight, most preferably at least 80%, passes thru a 200 mesh U.S. Standard Sieve (openings of 74 microns).

Desirably, the base mix also contains from 6–20%, preferably 10–18%, by weight of a powdered fat, preferably derived from partially hydrogenated vegetable oils. The melting point of the fat should be within the range of 105° F.–160° F. (40° C. to 70° C.). The fat is included in the coating mix to add moistness and flavor to the cooked chicken and to serve as a partial replacement of the fat present in chicken skin. At levels above about 20% of the base mix, the baked coating will have a greasy appearance and flavor. The particle size of the powdered fat is preferably at least 50% by weight, most preferably at least 80% by weight, between 149 microns (100 U.S. Standard Sieve) and 595 microns (30 U.S. Standard Sieve).

Preferably, the coating base mix will contain from 0.5–4 parts CMC, from 6–20 parts high-amylose starch and from 25–50 parts maltodextrin. The base mix will preferably also contain 5–15 parts by weight powdered fat and from 6–20 parts pregelatinized starch. The ratio of gum to ungelatinized starch to dextrin in the base mix is preferably 1:4–10:15–38. Typically, the base mix will comprise from 50–75%, preferably from 60–70%, of the total coating mix formulation.

Pieces of skinless chicken coated with the mix of this invention are typically baked for 30–40 minutes in a conventional oven at 375° F. (190.6° C.) to 425° F. (218.3° C.). The resulting chicken has a surface coating which simulates to appearance and texture of baked chicken skin.

This invention is further described but not limited by the following examples.

EXAMPLE 1

| INGREDIENT | PARTS BY WEIGHT |
| --- | --- |
| Dextrin | 40.4 |
| High-Amylose Corn Starch | 13.8 |
| Chloride Salts | 7.7 |
| Powdered Vegetable Fat | 8.3 |
| Sucrose | 6.9 |

-continued

| INGREDIENT | PARTS BY WEIGHT |
| --- | --- |
| Onion, Garlic & Soy Sauce Powders | 9.0 |
| CMC Gum (Aqualon 9H4XF) | 2.8 |
| Paprika & Black Pepper | 2.4 |
| Other Flavor & Color Agents | 6.2 |

A savory roast-flavored coating mix was prepared by dry-blending the ingredients recited above. The mix was then applied to the surface of skinless chicken breasts by adding 89.5 grams of the mix to a plastic shaker bag and shaking one or two chicken pieces (one at a time) with the mix. The coated chicken pieces were then placed on an ungreased or foil-lined baking pan and baked for 35 minutes at 400° F. (204.4° C.).

The resulting baked chicken pieces had a coating which was seen as having the appearance and texture of real chicken skin.

EXAMPLE 2

| INGREDIENT | PARTS BY WEIGHT |
| --- | --- |
| Dextrin | 28.4 |
| Pregelatinized Starch | 9.9 |
| High-Amylose Corn Starch | 7.2 |
| Powdered Shortening | 7.2 |
| CMC Gum (Aqualon 9H4XF) | 0.9 |
| Sugar | 9.0 |
| Salt | 5.4 |
| Onion & Garlic Powder | 9.0 |
| Paprika & Black Pepper | 3.2 |
| Other Flavor & Color Agents | 8.9 |
| Emulsifier | 0.9 |

A roast-flavored coating mix was prepared by dry-blending the ingredients recited above. 90.0 grams of this mix was coated onto chicken and cooked as in Example 1. The resulting baked chicken pieces had a skin-like coating with an improved texture.

Having thus described the invention what is claimed:

1. A dry coating mix for use on skinless chicken and designed to simulate the appearance and texture of chicken skin after baking in a conventional oven, said mix being comprised of:
   (a) 25–30 parts of a maltodextrin having a D.E. of from 5–20;
   (b) 6–20 parts of ungelatinized, high-amylose starch;
   (c) 0.5–4 parts of a carboxymethylcellulose gum, said mix being free of farinaceous components and said mix containing, on a weight basis absent flavor and color agents, from 40–70% of said maltodextrin, from 10–25% of said ungelatinized starch and from 1–5% of said gum.

2. The coating mix of claim 1 wherein the mix further contains from 5–15 parts by weight of a powdered fat material.

3. The coating mix of claim 2 wherein the mix further contains from 6–20 parts pregelatinized starch.

4. The coating mix of claim 3 wherein the mix further comprises 10–25% pregelatinized starch.

5. The coating mix of claim 1 wherein the mix consists of, on a weight basis absent flavor and color agents, from 40–70% of said maltodextrin, from 10–18% of said ungelatinized starch, from 1–5% of said gum, from 6–20% of powdered fat material and from 10–25% of pregelatinized starch.

6. The coating mix of claim 1 wherein the high-amylose starch is derived from corn.

7. The coating mix of claim 1 wherein the carboxymethylcellulose gum is high viscosity gum having a degree of substitution of at least 0.7.

8. The coating mix of claim 1 wherein the weight ratio of gum to ungelatinized starch to dextrin is 1:4 10:15–38.

9. A method for preparing baked chicken having simulated chicken skin comprised of:

(a) applying a dry coating mix to the surface of skinless chicken pieces, said coating mix containing, on a weight basis, from 25–50 parts of maltodextrin having a D.E. of from 5–20, 6–20 parts of ungelatinized, high-amylose starch, 5–15 parts of powdered fat and 0.5–4 parts of carboxymethylcellulose gum and said coating mix containing, on a weight basis absent flavor and color agents from 40–70% of said maltodextrin, from 10–25% of said ungelatinized starch, from 1–5% of said gum and from 6–20% of a powdered fat material;

(b) baking the coated pieces in a conventional oven at 375° F. to 425° F.

10. The method of claim 9 wherein the mix consists of, on a weight basis absent flavor and color agents, from 40–70% of said maltodextrin, from 10–18% of said ungelatinized starch, from 1–5% of said gum, from 6–20% of powdered fat material and from 10–25% pregelatinized starch.

11. The method of claim 9 wherein the high-amylose starch is derived from corn.

12. The method of claim 9 wherein the carboxymethylcellulose gum is high viscosity gum having a degree of substitution of at least 0.7.

13. The method of claim 9 wherein the weight ratio of gum to ungelatinized starch to dextrin is 1:4–10:15–38.

14. The coating mix of claim 2 wherein the mix contains from 6–20% powdered fat on a weight basis absent flavor and color agents.

\* \* \* \* \*